United States Patent [19]

Shinkai

[11] Patent Number: 4,700,334
[45] Date of Patent: Oct. 13, 1987

[54] TRACKING CONTROL WITH TWO SERVOLOOPS FOR USE IN OPTICAL DISC PLAYERS

[75] Inventor: Mitsutoshi Shinkai, Kanagawa, Japan

[73] Assignee: Sony Corporation, Tokyo, Japan

[21] Appl. No.: 737,169

[22] Filed: May 23, 1985

[30] Foreign Application Priority Data

May 23, 1984 [JP] Japan .................................. 59-103807

[51] Int. Cl.⁴ ............................................... G11B 7/00
[52] U.S. Cl. ......................................... 369/44; 369/46
[58] Field of Search ............................. 369/44, 45, 46; 358/342; 250/201-204

[56] References Cited
U.S. PATENT DOCUMENTS
4,587,644 5/1986 Fujii ....................................... 369/44

Primary Examiner—Robert L. Richardson
Attorney, Agent, or Firm—Lewis H. Eslinger; Alvin Sinderbrand

[57] ABSTRACT

A tracking control arrangement for use in an optical disc player comprises a photodetector for receiving a light beam reflected from an optical disc on which an information signal is recorded in a record track, a signal generating circuit for generating a reproduced information signal and a tracking error signal from the output of the photodetector, and a modifier for modifying the tracking error signal in response to variations in the total quantity of light of the light beam received by the photodetector. A driving circuit drives an optical device to maintain the light beam in a proper tracking relation to the record track in response to the modified tracking error signal. A detector detects a variation in the reproduced information signal resulting from the condition in which the light beam reflected from a blank area in the record track is received by the photodetector, and a gain controller varies the gain of transmission of the modified tracking error signal from the modifier to the driver in response to a predetermined detection output of the detector.

8 Claims, 11 Drawing Figures

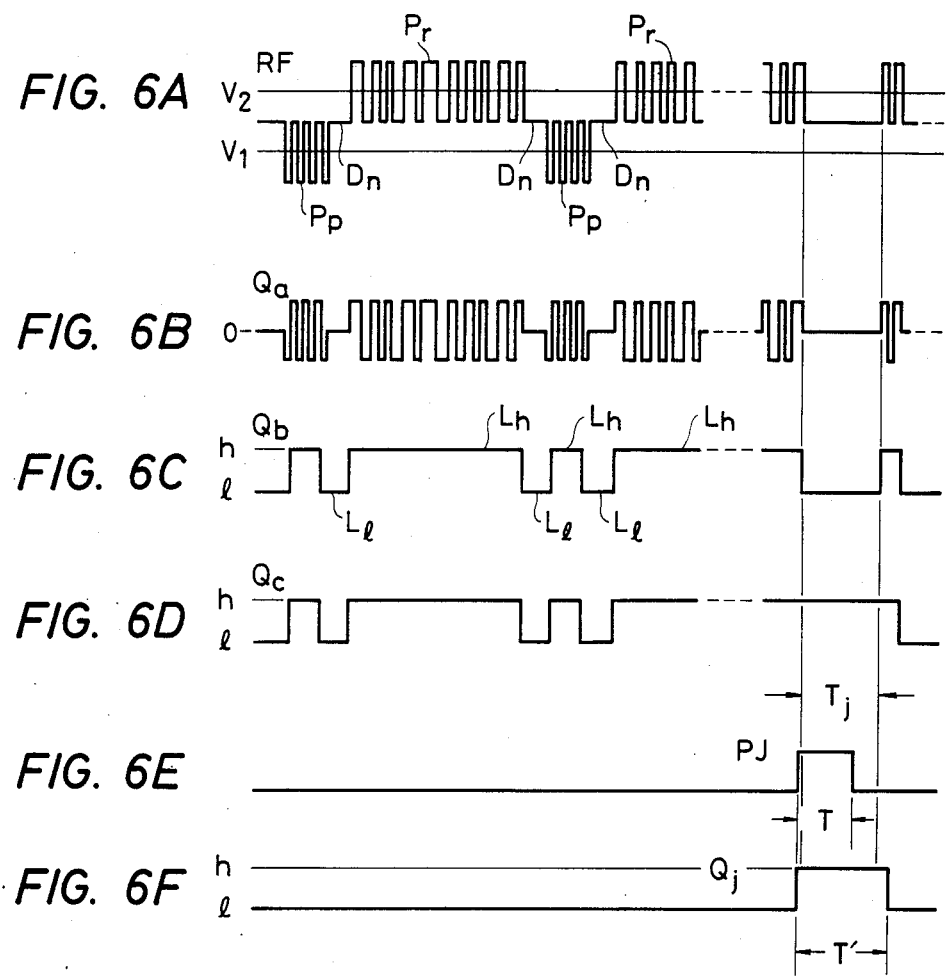

TRACKING CONTROL WITH TWO SERVOLOOPS FOR USE IN OPTICAL DISC PLAYERS

BACKGROUND OF THE INVENTION

1. Field of the Invention

The present invention relates generally to tracking control arrangements for use in optical disc players, and more particularly, is directed to an improved tracking servocontrol arrangement suitable for use in an optical disc player which can reproduce an information signal from a record track formed on an optical disc available for inscribing.

2. Description of the Prior Art

There has been proposed an optical disc available for inscribing of information which has generally concave preformed grooves on a recording surface thereof for providing address information of record tracks or the like. The optical disc for inscribing of a so-called land-type recording is provided on a recording surface thereof with a precut portion as shown in FIG. 1 of the accompanying drawings, for example.

In case of the optical disc shown in FIG. 1, a precut portion 2 is constituted with a bank 1 which is called a "land" and provided on a recording surface with a height corresponding to one eighth of the wavelength of a light beam impinging thereon and a plurality of grooves G which are provided on the bank 1 with a depth corresponding to one fourth of the wavelength of the light beam impinging on the bank 1 and by which address information signals or other information signals are recorded. A portion of the top surface of the bank 1 following the precut portion 2 forms a recording portion 3 available for inscribing information signals thereon.

In an optical disc player working with such an optical disc available for inscribing to record an information signal on a spiral record track composed of precut portions and recording portions formed on the optical disc as mentioned above and to reproduce an information signal recorded on the spiral record track formed on the optical disc, a light beam is used for inscribing the information signal on the recording portions in the spiral record track on the optical disc and for reading the information signal from the spiral record track on the optical disc. The light beam is directed to impinge on the optical disc caused to rotate through an optical head which is moved radially of the optical disc and is required to trace correctly the spiral record track on the optical disc. To make the light beam comply with this requirement, tracking servocontrol is performed for maintaining the light beam, which is directed onto the optical disc through the optical head moved radially of the optical disc, in correct tracking relation to the spiral record track on the optical disc in both the recording operation and the reproducing operation.

In order to carry out such tracking servocontrol, the optical disc player is provided with a tracking control arrangement which is operative to produce a tracking error signal representing positional deviation of a beam spot formed on the recording surface by the light beam from the center of each portion of the spiral record track, that is tracking error, in response to the output signal of a photosensing device to which the light beam directed through the optical head to the optical disc and then reflected from the recording surface of the optical disc is led, and to drive an optical element, for example, a lens or a mirror partially constituting the optical head, to control the position thereof in response to the tracking error signal.

A proposed optical system containing such a tracking control arrangement for use in the optical disc player is shown in FIG. 2. In FIG. 2, an optical disc D has a spiral record track composed of precut portions 2 and recording portions 3 such as shown in FIG. 1 on a recording surface thereof and is rotated at predetermined speed around the center thereof.

On the occasion of the reproducing operation, a laser light beam emitted from a laser light source 4 passes through a collimating lens 5 and enters beam splitters 6 and 7 aligned to pass through the same. The laser light beam, after having passed through the beam splitters 6 and 7, passes through a quarter-wave plate 8 and an object lens 9 which focusses the laser light beam on the recording surface of the disc D. The object lens 9 is set to be moved in a direction transverse to the record track on the bank 1 and in a direction perpendicular to the recording surface on the disc D by a tracking control driving device 10 and a focus control driving device 11, respectively. The laser light beam caused to impinge on the disc D is modulated in intensity in accordance with the record track thereon and then reflected therefrom to pass through the object lens 9 and the quarter-wave plate 8 into the beam splitter 7. A part of the laser light beam from the disc D is refracted to the right in FIG. 2 at the beam splitter 7 and the rest of the laser light beam from the disc D passes through the beam splitter 7 into the beam splitter 6 to be refracted thereat to the right in FIG. 2. The laser light beam refracted by the beam splitter 7 passes through a lens portion 12a to a photodetector 13 to be used for detection of tracking error of the laser light beam on the record surface of the disc D, while the laser light beam refracted by the beam splitter 6 passes through a lens portion 12b to the photodetector 13 to be used for detection of focus error of the laser light beam on the record surface of the disc D and for production of a reproduced information signal.

The photodetector 13 comprises a plurality of light detecting elements, each of which detects the laser light beam emerging from the beam splitter 7 or 6 and produces an output signal in response to the variations in intensity of the detected laser light beam. The output signals derived from the photodetector 13 are supplied to a signal processor 14 containing a tracking servocontrol circuit and a focus servocontrol circuit. The tracking servocontrol circuit produces a driving signal for tracking servocontrol which is supplied to the tracking control driving device 10 for moving the object lens 9 to control the position thereof so that the tracking servocontrol is performed, and the focus servocontrol circuit produces a driving signal for focus servocontrol for maintaining correct focusing of the laser light beam caused to impinge on the disc D, which is supplied to the focus control driving device 11 for moving the object lens 9 to control the position thereof so that the focus servocontrol is performed. Further, the reproduced information signal is also derived from the signal processor 14.

In the optical system described above, the tracking control arrangement is constituted with the light detecting elements forming the photodetector 13, the tracking servocontrol circuit in the signal processor 14 and the tracking control driving device 10, and one example of such tracking control arrangement proposed previously is shown in FIG. 3.

In the arrangement shown in FIG. 3, the photodetector 13 comprises a photodetecting device 15 including a pair of light detecting elements 15A and 15B for detecting tracking error and a photodetecting device 16 including a group of four light detecting elements 16A, 16B, 16C and 16D for detecting focus error and producing the reproduced information signal. The photodetecting devices 15 and 16 are so positioned that the laser light beam emerging from the beam splitter 7 forms a beam spot on the photodetecting device 15 and the laser light beam emerging from the beam splitter 6 forms a beam spot on the photodetecting device 16.

The light detecting elements 15A and 15B produce respectively output signals Sa and Sb. These output signals Sa and Sb are amplified by amplifires 17a and 17b, respectively, and then supplied to a subtracter 18 in which the difference between the output signals Sa and Sb is obtained. The subtracter 18 produces a tracking error signal TE, which corresponds to the difference between the output signals Sa and Sb and represents positional deviation of a spot formed on the recording surface of the disc D by the laser light beam from the center of each portion of the record track on the disc D and the tracking error signal TE is supplied to one of the input terminals of a dividing circuit 24. The amplitude of the tracking error signal TE varies in response to not only variations in the tracking error but also variations in the total quantity of light of the laser light beam received by photodetecting device 15.

At the same time, the light detecting elements 16A–16D produce respectively output signals Ra, Rb, Rc, and Rd. The output signals Ra and Rc derived respectively from the light detecting elements 16A and 16C are supplied to an adder 19 to be added to each other and an output signal Ra+Rc is obtained from the adder 19. Similarly, the output signals Rb and Rd derived respectively from the light detecting elements 16B and 16D are supplied to an adder 20 to be added to each other and an output signal Rb+Rd is obtained from the adder 20. Then, the output signals Ra+Rc and Rb+Rd derived respectively from the adders 19 and 20 are supplied to an adder 21 to be further added to each other and a reproduced information signal RF, which is identical to a signal Ra+Rb+Rc+Rd, is obtained from the adder 21. The output signals Ra+Rc and Rb+Rd are also supplied to a subtracter 22 in which the difference between the output signals Ra+Rc and Rb+Rd is obtained. The subtracter 22 produces a focus error signal FE which corresponds to the difference between the output signals Ra+Rc and Rb+Rd and represents defocusing of the laser light beam caused to impinge on the disc D.

The reproduced information signal RF obtained from the adder 21 has the respective different waveforms in the period in which the laser light beam caused to impinge on the recording surface of the disc D is tracing the precut portion 2 on the record track and in the period in which laser light beam caused to impinge on the recording surface of the disc D is tracing the recording portion 3 on the record track. By way of example, with a constant quantity of light of the laser light beam directed onto the disc D, during the period in which the laser light beam is tracing the precut portion 2, the reproduced information signal RF takes a high level which is laid between a level $V_1$ and a level $V_2$ higher than the level $V_1$ and a low level which is lower than the level $V_1$ so as to cross over the level $V_1$ intermittently, as shown in FIG. 4. On the other hand, during the period in which the laser light beam is tracing the recording portion 3, the reproduced information signal RF takes a high level which is higher than the level $V_2$ and a low level which is laid between the level $V_1$ and the level $V_2$ so as to cross over the level $V_2$ intermittently when the laser light beam impinges on a recorded area R in the recording portion 3 where an information signal is recorded and also takes the low level between the level $V_1$ and the level $V_2$ continuously when the laser light beam impinges on a blank area N in the recording portion 3 where any information signal is not recorded yet. Further, the reproduced information signal RF obtained from the adder 21 has an amplitude variation with relatively low frequency which results from variations in the total quantity of light of the laser light beam received by the photodetecting device 16 and therefore is in proportion to the variations in the total quantity of light of the laser light beam received by the photodetecting device 15.

The reproduced information signal RF thus obtained is supplied to a low pass filter 23 and a control signal RFo, which has a level varying in response to the above mentioned amplitude variation with relatively low frequency of the reproduced information signal RF, is obtained from the low pass filter 23. This control signal RFo is supplied to the other of the input terminals of the dividing circuit 24 as a signal having an amplitude varying in proportion to the variations in the total quantity of light of the laser light beam received by the photodetecting device 15.

In the dividing circuit 24, the operation equivalent to a division for dividing a value corresponding to the amplitude of the tracking error signal TE by a value corresponding to the amplitude of the control signal RFo is performed, and a modified or normalized tracking error signal TE' which is intended to have an amplitude corresponding to the amplitude of the tracking error signal TE without the variation resulting from the variations in the total quantity of light of the laser light beam received by photodetecting device 15 and varying properly in response to the variations in the tracking error even though the total quantity of light of the laser light beam received by photodetecting device 15 is varied, is obtained from the dividing circuit 24. This modified tracking error signal TE' is supplied through a phase compensating circuit 25 and a driving circuit 26 to the tracking control driving device 10 as the driving signal for tracking servocontrol. The tracking control driving device 10 supplied with the driving signal for tracking servocontrol causes the laser light beam impinging on the recording surface of the disc D to move in the direction transverse to the record track on the recording surface to be in correct tracking relation to the record track.

When the tracking servocontrol is performed by the tracking control arrangement as described above in the reproducing operation in which the information signal recorded on the optical disc D having the spiral record disc composed of the precut portions 2 and the recording portions 3 as shown in FIG. 1 is read, since the average reflectivity at the recorded area R in the recording portions 3 is distinctively higher than the average reflectivity at the blank area N in the recording portion 3, the total quantity of light of the laser light beam received by the photodetecting devices 15 and 16 during the period in which the laser light beam impinges on the recorded area R is distinctively more than that during the period in which the laser light beam impinges on the blank area N. However, the amplitude of the tracking error signal TE' obtained from the dividing circuit 24 is not affected by the difference between the total quantity of light of the laser light beam received by the photodetecting device 15 during the period in which the laser light beam impinges on the recorded area R and the similar total quantity of light during the period in which the laser light beam impinges on the blank area N, and takes the same level both in the period in which the laser light beam impinges on the recorded area R and in the period in which the laser light beam impinges on the blank area N, if the degree of the tracking error is not varied between both periods.

Under such a condition, the amplitude of the tracking error signal TE is always modified in the dividing circuit 24 in response to the variations in the total quantity of light of the laser light beam received by the photodetecting device 15, so that the modified tracking error signal TE' is produced. Accordingly, the amplification of the tracking error signal TE in order to obtain the modified tracking error signal TE' from the dividing circuit 24 during the period in which the laser light beam impinges on the recorded area R is made to be smaller than that during the period in which the laser light beam impinges on the blank area N even if the degree of the tracking error is not varied between both periods, and consequently a loop gain with which the tracking servocontrol circuit performs the control operation is varied, so that the control operation is carried out with a relatively high gain when the laser light beam impinges on the blank area N and with a relatively low gain when the laser light beam impinges on the recorded area R. This results in the disadvantage that the tracking servocontrol is apt to be made unstable and the information signal may not be read properly from the spiral record track on the optical disc D.

OBJECTS AND SUMMARY OF THE INVENTION

Accordingly, it is an object of the present invention to provide a tracking control arrangement for use in an optical disc player to maintain a light beam impinging on an optical disc in correct tracking relation to a record track on the optical disc, which avoids the aforementioned disadvantage in respect to tracking control encountered with the prior art.

Another object of the present invention is to provide a tracking control arrangement for use in an optical disc player in which a light beam is caused to impinge on an optical disc available for inscribing for reading an information signal from a record track formed on the optical disc, which can perform tracking servocontrol stably to maintain a light beam directed onto the optical disc in correct tracking relation to the record track on the optical disc.

A further object of the present invention is to provide a tracking control arrangement for use in an optical disc player in which a light beam is caused to impinge on an optical disc available for inscribing on which an information signal is recorded in a record track and, after being reflected at the optical disc, received by a photodetector and a tracking error signal is produced from the output of the photodetector to be used for tracking servocontrol for maintaining the light beam in correct tracking relation to the record track on the optical disc, which can perform the tracking servocontrol stably in both the period in which the light beam reflected at a recorded area in the record track is received by the photodetector and the period in which the light beam reflected at a blank area in the record track is received by the photodetector.

According to an aspect of the present invention, there is provided a tracking control arrangement for use in an optical disc player having an optical device for causing a light beam to impinge on an optical disc on which an information signal is recorded in a record track containing a recorded area and a blank area, the tracking control arrangement comprising photodetecting means for receiving a light beam reflected at the optical disc to produce an output in response to the light beam received thereby, signal generating means for generating a first signal corresponding to the information signal and a second signal representing tracking error of the light beam impinging on the optical disc from the output of the photodetecting means, signal modifying means for modifying the second signal in response to variations in the total quantity of light of the light beam received by the photodetecting means to produce a modified signal, driving means for driving the optical device to maintain the light beam impinging on the optical disc in a predetermined tracking relation to the record track on the optical disc in response to the modified signal, detecting means for detecting a variation in the first signal resulting from the condition in which the light beam reflected at the blank area in the record track is received by the photodetecting means, and gain control means for transmitting the modified signal to the driving means and varying the gain for transmission of the modified signal in response to a predetermined detection output obtained from the detecting means.

In the tracking control arrangement thus constituted in accordance with the present invention, the loop gain with which the tracking servocontrol is performed can be set appropriately in both the period in which the light beam reflected at the recorded area in the record track on the optical disc is received by the photodetector and the period in which the light beam reflected at the blank area in the record track on the optical disc is received by the photodetector, even if the total quantity of light of the light beam received by the photodetector is varied between the period in which the light beam impinges on the record area and the period in which the light beam impinges on the blank area. Accordingly, the tracking servocontrol can be performed stably in the playing operation of the optical disc player for reproducing an information signal from an optical disc available for inscribing.

The above and other objects, features and advantages of the present invention will become apparent from the following detailed description taken in conjunction with the accompanying drawings.

BRIEF DESCRIPTION OF THE DRAWINGS

FIGS. 6A to 6F are waveform diagrams used for explaining the operation of the embodiment shown in FIG. 5.

DESCRIPTION OF THE PREFERRED EMBODIMENT

Now, one embodiment of tracking control arrangement for use in an optical disc player according to the present invention will be described in detail with reference to the drawings hereinafter.

Figure 2:
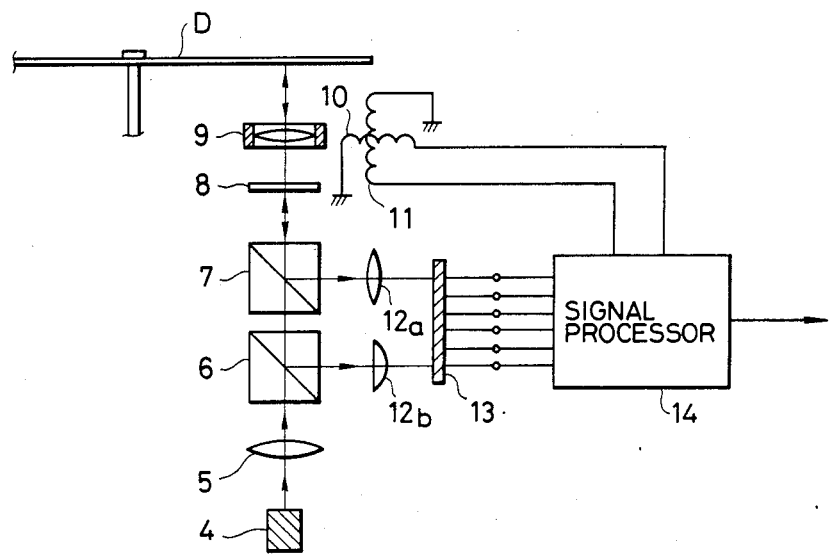
FIG. 2 is a schematic illustration of an optical system employed in an optical disc player.
Figures 3, 4:
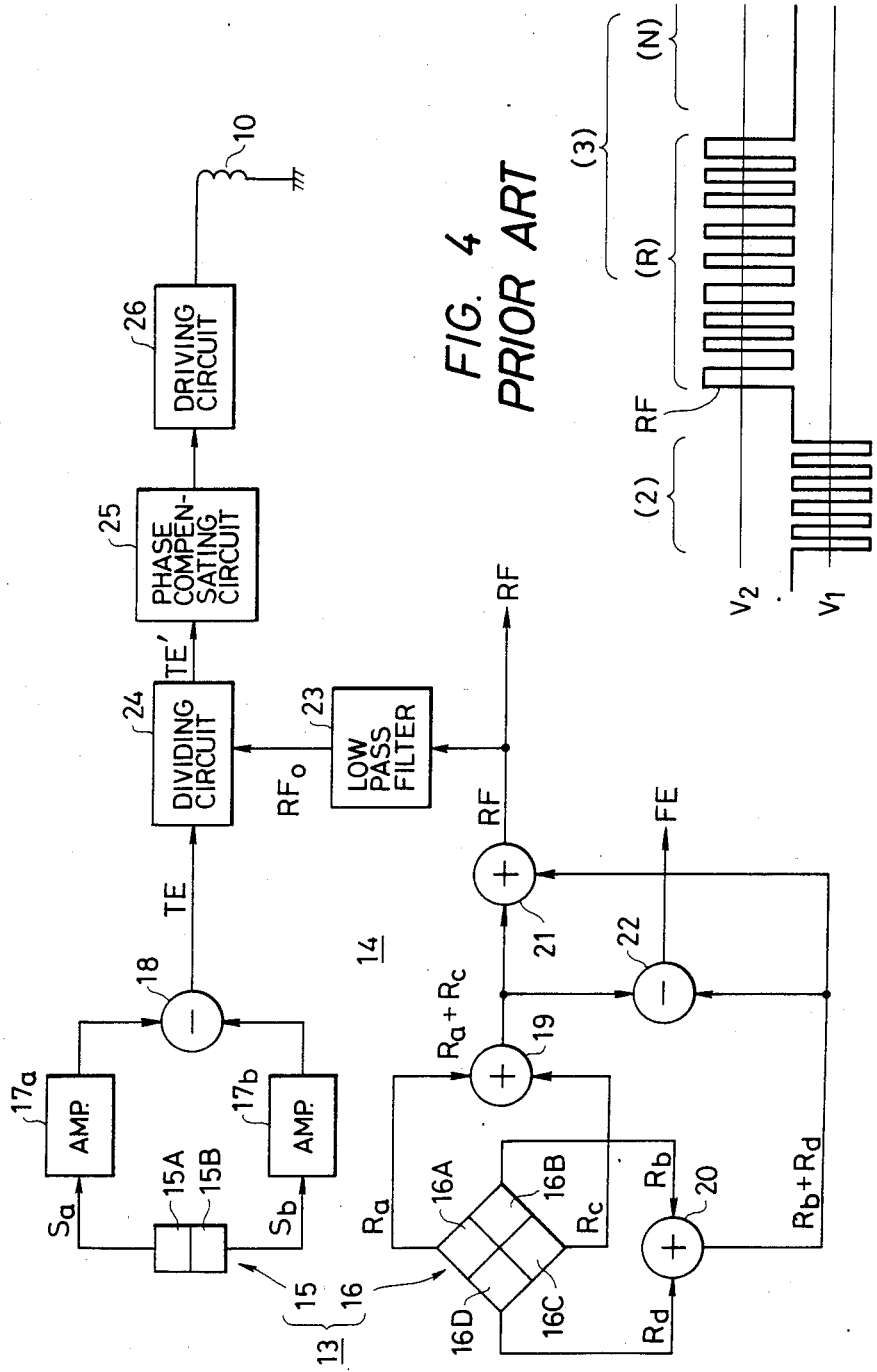
FIG. 3 is a block diagram showing an example of a previously proposed tracking control arrangement used in the optical system shown in FIG. 2.
FIG. 4 is a waveform diagram of a signal read from an optical disc having such a recording surface as shown in FIG. 1.
Figure 5:
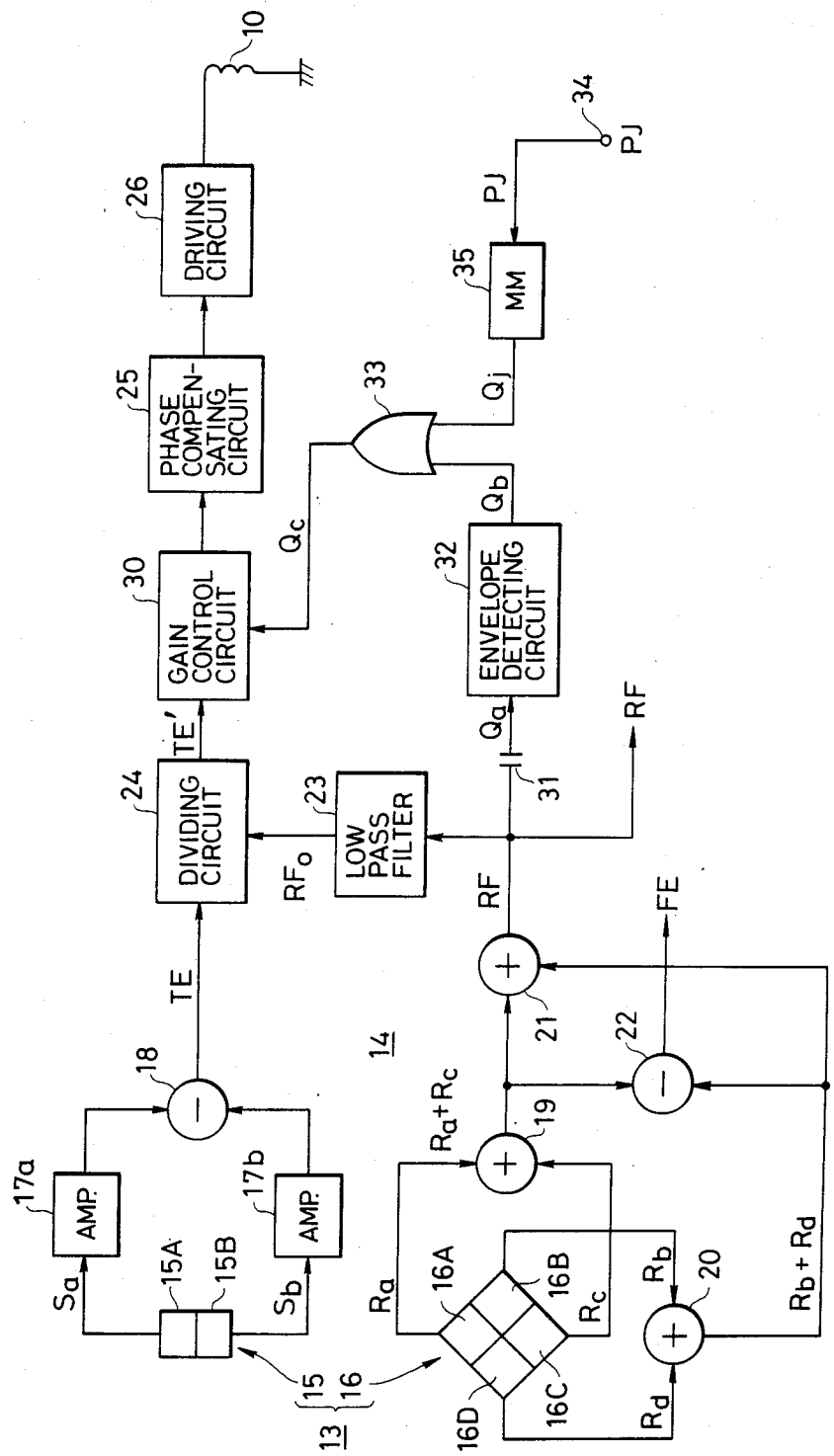
FIG. 5 is a block diagram showing a tracking control arrangement embodying the present invention for use in an optical disc player.

FIG. 5 shows one example of a tracking control arrangement embodying the present invention for use in an optical disc player having an optical system as shown in FIG. 2. In FIG. 5, elements, circuit blocks and signals corresponding to those of FIG. 3 are marked with the same references and further description thereof will be omitted.

In the example shown in FIG. 5, a gain control circuit 30 is provided between the output end of the dividing circuit 24 and the input end of the phase compensating circuit 25 for controlling the gain of a driving portion in which a driving signal based on the modified tracking error signal TE′ from the dividing circuit 24 is supplied to the tracking control driving device 10.

An envelope detecting circuit 32 is also connected through a capacitor 31 to the output end of the adder 21 and the output end of the envelope detecting circuit 32 is connected to one of the input terminals of an OR gate circuit 33. The output end of the OR gate circuit 33 is connected to the control terminal of the gain control circuit 30.

Further, a monostable multivibrator (M M) 35 is connected to a terminal 34 to which a track jump command signal for causing the laser light beam impinging on the optical disc D to carry out a track jump operation is to be supplied, and the output end of the monostable multivibrator 35 is connected to the other of the input terminals of the OR gate circuit 33. Other portions of the embodiment are constituted in the same manner as the tracking control arrangement shown in FIG. 3.

Figure 1:
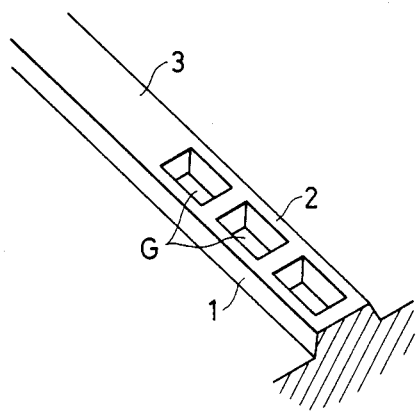
FIG. 1 is a schematic illustration showing partially a recoding surface of an optical disc available for inscribing.

In the reproducing operation of the optical disc player which employs the tracking control arrangement constituted as mentioned above according to the present invention and on which the optical disc D having the spiral record disc composed of the precut portions 2 and the recording portions 3 as shown in FIG. 1 is loaded, the tracking error signal TE is obtained from the subtracter 18 to be supplied to the dividing circuit 24 and the modified tracking error signal TE′, which is intended to have an amplitude independent of variations in the total quantity of light of the laser light beam received by photodetecting device 15, is derived from the dividing circuit 24 through the operation equivalent to a division for dividing a value corresponding to the amplitiude of the tracking error signal TE by a value corresponding to the amplitude of the control signal RFo from the low pass fillter 23 performed in the dividing circuit 24, similarly to the case of the tracking control arrangement shown in FIG. 3. The modified tracking error signal TE′ is supplied through the gain control circuit 30 and the phase compensating circuit 25 to the driving circuit 26 and a driving signal based on the modified tracking error signal TE′ supplied to the driving circuit 26 is derived from the driving circuit 26 to be supplied to the tracking control driving device 10, so that the object lens 9 is driven to maintain the laser light beam impinging on the disc D in a correct tracking relation to the record track on the disc D in response to the modified tracking error signal TE′.

In this operation, as shown in FIG. 6A, the reproduced information signal RF derived from the adder 21 includes a signal component Pp obtained from the precut portion 2 on the disc D with the amplitude crossing over the level $V_1$ intermittently, a DC component Dn obtained from the blank area in the recording portion 3 on the disc D with the level between the levels $V_1$ and $V_2$, and a signal component Pr obtained from the recorded area in the recording portion 3 with the amplitude crossing over the level $V_2$ intermittently. This reproduced information signal RF is passed through the capacitor 31 so that the DC component Dn is eliminated from the reproduced information signal RF to produce a signal Qa as shown in FIG. 6B and the signal Qa is supplied to the envelope detecting circuit 32. Then, from the envelope detecting circuit 32, a signal Qb taking selectively a high level h and a low level l in response to the envelope of the signal Qa is obtained as shown in FIG. 6C. A portion Lh taking the high level h of the signal Qb represents the period in which the reproduced information signal RF is obtained from the precut portion 2 or the recorded area in the recording portion 3 on the disc D, while a portion Ll taking the low level l of the signal Qb represents the period in which the reproduced information signal RF is obtained from the blank area in the recording portion 3 on the disc D. That is, the portion Ll taking the low level l of the signal Qb indicates that the laser light beam reflected at the blank area in the recording portion 3 on the disc D is received by the photodetecting device 15.

The signal Qb is supplied to the OR gate circuit 33 and a signal Qc taking the high level h in synchronism with the portion Lh of the signal Qb and the low level l in synchronism with the portion Ll of the signal Qb, as shown in FIG. 6D, is obtained from the OR gate circuit 33 to be supplied to the control terminal of the gain control circuit 30. With this signal Qc from the OR gate circuit 33, the gain control circuit 30 is caused to control the gain for transmission of the modified tracking error signal TE′ to be increased during the period in which the signal Qc takes the high level h. When the signal Qc takes the high level h, the laser light beam reflected at the recorded area in the recording portion 3 on the disc D is received by the photodetecting device 15 and therefore the amplitude of the modified tracking error signal TE′ is modified to be decreased before being supplied to the gain control circuit 30. Accordingly, with the gain for transmission of the modified tracking error signal TE′ increased in the gain control circuit 30, an appropriate loop gain for tracking servo-control can be set in the arrangement shown in FIG. 5.

During the period in which the signal Qc takes the low level l, the gain control circuit 30 is caused to control the gain for transmission of the modified tracking error signal TE′ to be decreased with the signal Qc from the OR gate circuit 33. When the signal Qc takes the low level l, the laser light beam reflected at the blank area in the recording portion 3 on the disc D is received by the photodetecting device 15 and therefore the amplitude of the modified tracking error signal TE′ is modified to be increased before being supplied to the gain control circuit 30. Accordingly, with the gain for transmission of the modified tracking error signal TE′ decreased in the gain control circuit 30, the appropriate loop gain for tracking servocontrol can be also set in the arrangement shown in FIG. 5.

In the meantime, when the track jump command signal Pj having the duration T as shown in FIG. 6E is supplied to the terminal 34 and the track jump operation, in which the beam spot formed on the optical disc D by the laser light beam is rapidly moved from a certain turn to another turn of the spiral record track, is carried out during a period Tj commencing immediately after the preceding edge of the track jump command signal Pj and terminating after the retarded edge of the track jump command signal Pj, the reproduced information signal RF derived from the adder 21 includes only the DC component Dn as shown in FIG. 6A because the information signal recorded on the disc D is not read during the track jump operation. Therefore, the signal Qb obtained from the envelope detecting circuit 32 includes only the portion Ll taking the low level l as shown in FIG. 6C in the period Tj in which the track jump operation is carried out and consequently the gain control circuit 30 is caused to control the gain for transmission of the modified tracking error signal TE' to be decreased if it were left as it is.

However, since the loop gain for tracking servocontrol is required to be large enough at the end of the track jump operation so that the laser light beam is controlled to form the beam spot thereof correctly on a desired turn of the record track and to come into proper tracking relation thereto, it is undesirable that the gain for transmission of the modified tracking error signal TE' is decreased in the gain control circuit 30 in the period Tj.

Accordingly, in the embodiment shown in FIG. 5, the track jump command signal Pj is supplied through the terminal 34 to the monostable multivibrator 35 and a signal Qj, which takes the high level h during a period T' commencing with the preceding edge of the track jump command signal Pj and is slightly longer than the period Tj, is obtained from the monostable multivibrator 35 to be supplied to the other of the input terminals of the OR gate circuit 33. With this signal Qj from the monostable multivibrator 35, the signal Qc obtained from the OR gate circuit 33 takes the high level h during the period Tj, as shown in FIG. 6D. As a result of this, the gain control circuit 30 is maintained in the condition for keeping the gain for transmission of the modified tracking error signal TE' to be increased, so that the problem incident to the track jump operation is avoided.

What we claim is:

1. Tracking control apparatus for use in an optical disc player having an optical device for causing a light beam to impinge on an optical disc on which an information signal is recorded in a record track containing a recorded area and a blank area, the tracking control apparatus comprising:
    photodetecting means for receiving a light beam reflected by the optical disc to produce an output in response to the light beam received thereby,
    signal generating means for generating a first signal corresponding to the information signal recorded on the optical disc and a second signal representing a tracking error of the light beam impinging on the optical disc from the output of said photodetecting means,
    signal modifying means for modifying said second signal in response to variations in the total quantity of light of the light beam received by said photodetecting means to produce a modified signal,
    driving means for driving the optical device to maintain the light beam impinging on the optical disc in a predetermined tracking relation to the record track on the optical disc in response to said modified signal,
    detecting means for detecting a variation in said first signal resulting from a condition in which the light beam reflected by the blank area in the record track is received by said photodetecting means, and
    gain control means for transmitting said modified signal to said driving means and varying the gain for transmission of said modified signal in response to a predetermined detection output obtained from said detecting means.

2. Tracking control apparatus according to claim 1; wherein said photodetecting means for receiving said light beam comprises a first light receiving portion for producing a first component of said output from which said first signal is generated and a second light receiving portion including a pair of light detecting elements for producing respectively first and second light detection output signals forming a second component of said output from which said second signal is generated.

3. Tracking control apparatus according to claim 2; wherein said signal generating means for generating said first and second signals comprises a first signal processing portion for processing said first component to produce said first signal and a second signal processing portion for determining the difference between said first and second light detection output signals to produce said second signal.

4. Tracking control apparatus according to claim 1; wherein said signal modifying means for modifying said second signal comprises control signal producing means for producing a control signal having an amplitude varying in response to variations in the amplitude of said first signal resulting from the variations in the total quantity of light of the light beam received by said photodetecting means and a dividing circuit operative to perform an operation equivalent to a division for dividing a value corresponding to the amplitude of said second signal by a value corresponding to the amplitude of said control signal.

5. Tracking control apparatus according to claim 4; wherein said control signal producing means comprises a low pass filter connected to said dividing circuit and supplied with said first signal.

6. Tracking control apparatus according to claim 1; wherein said detecting means comprises a capacitor responsive to said first signal for eliminating a DC component of said first signal to produce thereby a level shifted signal and an envelope detecting circuit for detecting the envelope of said level shifted signal and producing an envelope detection output signal having a level varying in response to the detected envelope to be supplied to said gain control means.

7. Tracking control apparatus according to claim 6; wherein said gain control means comprises a gain control circuit having an input terminal supplied with said modified signal, a control terminal supplied with said envelope detection output signal and an output terminal at which said modified signal appears with a level controlled in response to the level of said envelope detection output signal.

8. Tracking control apparatus according to claim 6; wherein said detecting means further comprises an OR gate circuit connected between said envelope detecting circuit and said gain control means and supplied with said envelope detection output signal and with an additional signal obtained in connection with a track jump operation performed in the optical disc player.

* * * * *